Feb. 1, 1938. C. W. FLOSS 2,106,870
TRANSMISSION
Filed July 17, 1933 5 Sheets-Sheet 4

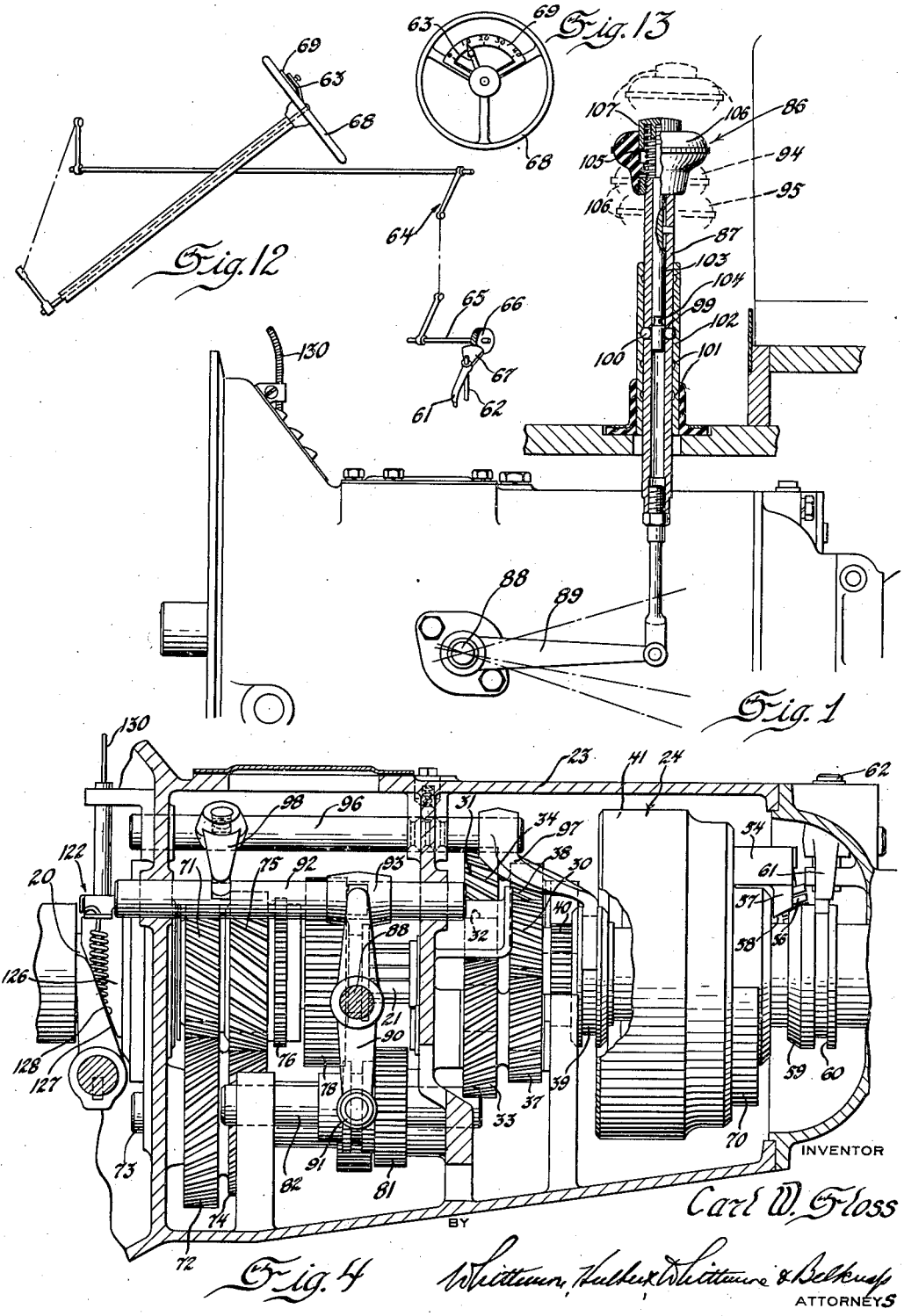

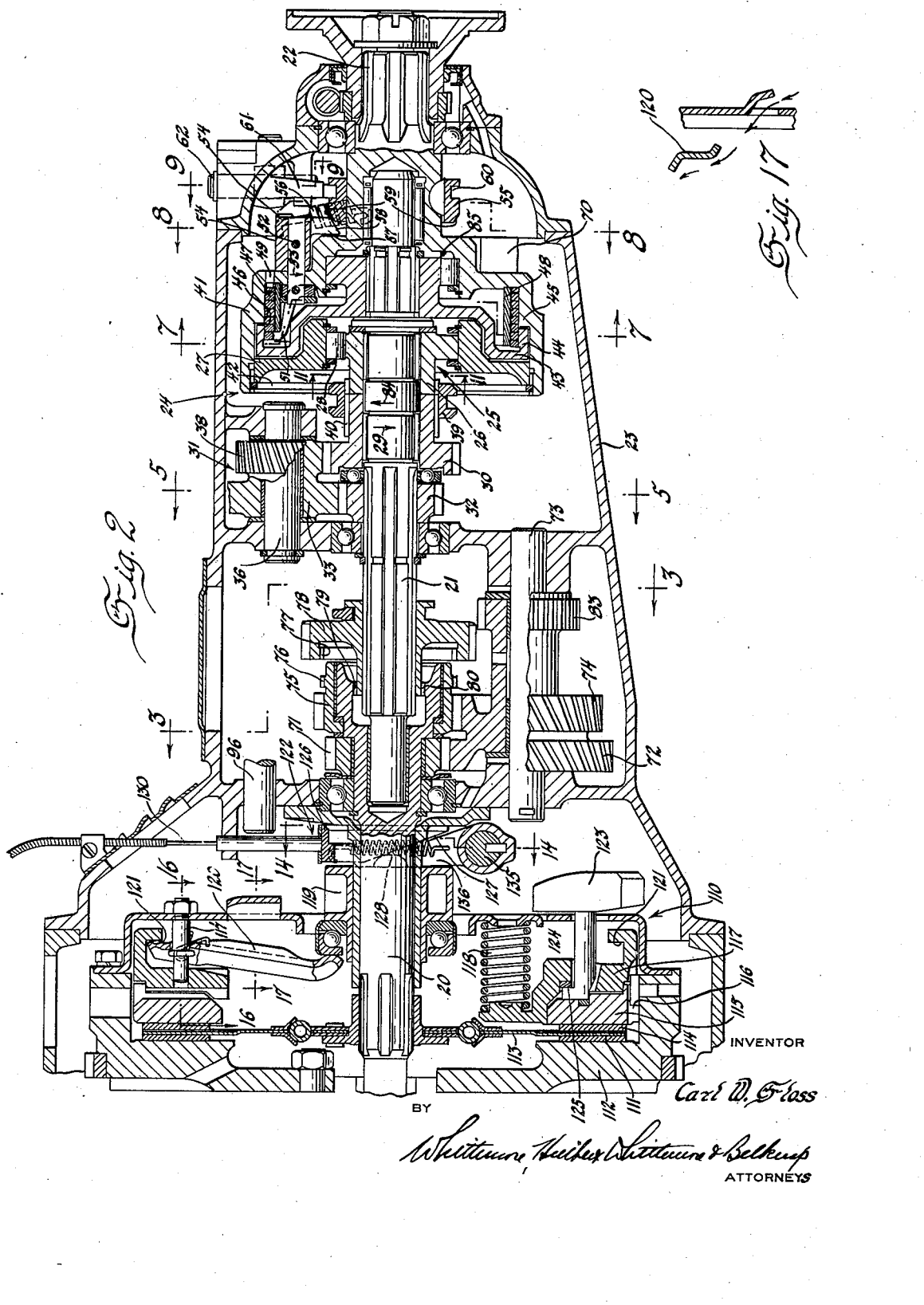

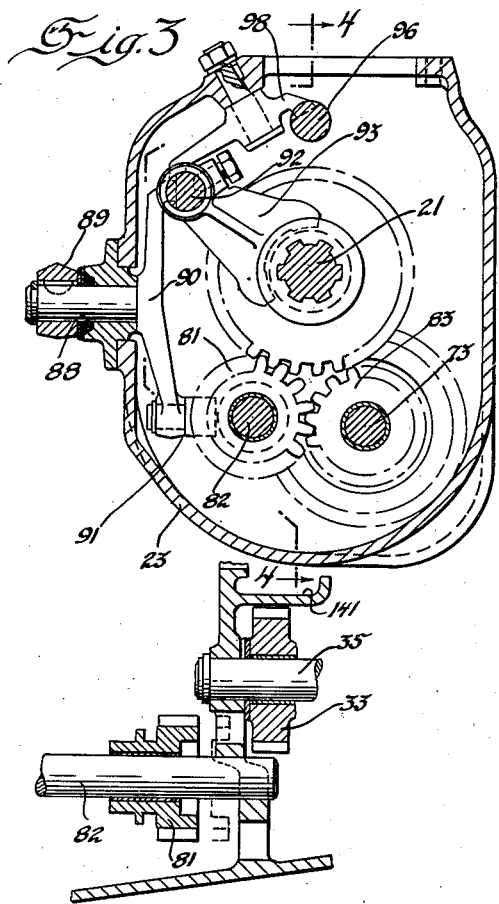
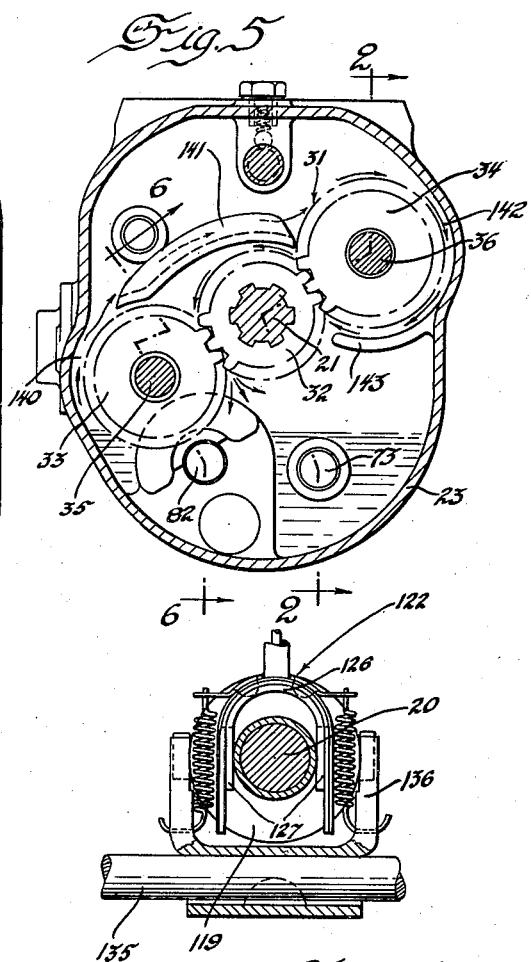
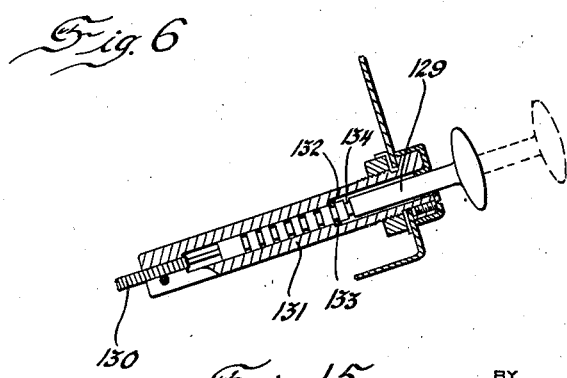

INVENTOR
Carl W. Floss
BY
Whittemore, Hulbert, Whittemore & Belknap
ATTORNEYS

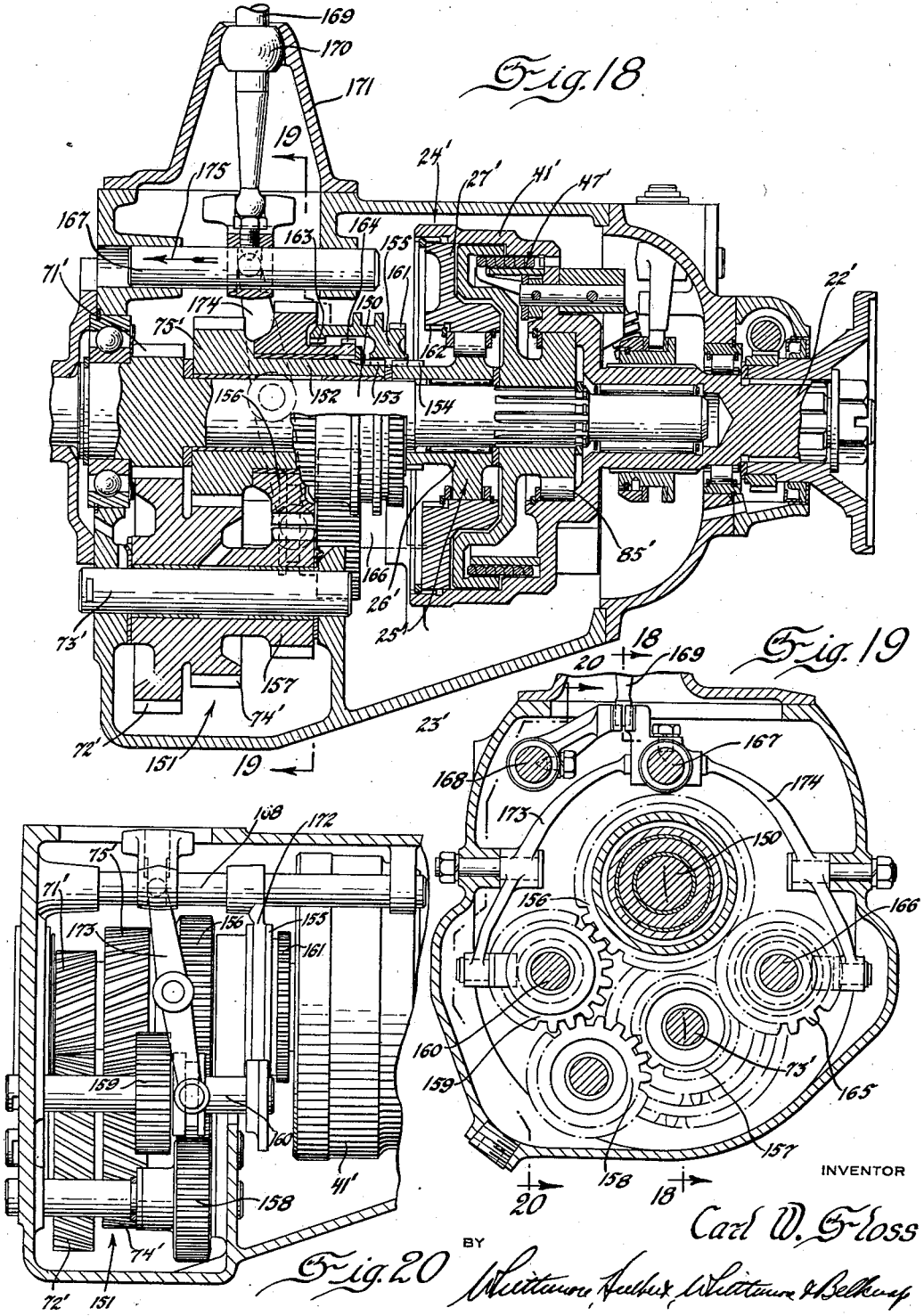

Patented Feb. 1, 1938

2,106,870

UNITED STATES PATENT OFFICE 2,106,870

TRANSMISSION

Carl W. Floss, Detroit, Mich.

Application July 17, 1933, Serial No. 680,866

17 Claims. (Cl. 74—336)

This invention relates generally to variable speed transmission mechanisms and refers more particularly to improvements in transmissions of the type wherein the gear ratio is automatically varied in dependence upon the speed of the driven shaft.

It has been proposed in the past to automatically vary the differential speed between the drive and driven members from zero to a predetermined maximum by employing a planetary reduction gear train between the aforesaid members together with means governed by the speed of the driven member for automatically progressively retarding the planetary action until the whole gearing including the driven member rotates at drive shaft speed. As is usually the case in constructions of the above type, the planetary action is retarded by a friction clutch which in turn is operated by centrifugal weights carried by the driven member of the planetary gearing so that as the speed of the driven member increases, the centrifugal force will react through the weights to apply the required pressure to the clutch for effecting the desired gradual coupling action referred to above. Although transmission mechanisms of the type briefly set forth have met with a certain degree of success, nevertheless, they are objectionable due to the difficulty heretofore encountered in securing silent operation of the planetary gearing and also due to the relatively high cost of such gearing.

It is, therefore, one of the principal objects of this invention to automatically vary the differential speed between two relatively rotatable members from zero to a predetermined maximum by mechanism inherently more quiet than planetary gearing and considerably simpler and less expensive than planetary gearing.

Another disadvantage of automatic transmissions in general is the lack of any means for selectively controlling the speed at which the ratio between the two relatively rotatable members is automatically changed. In other words, the transmissions are originally designed to change the ratio between the required parts at a predetermined speed carefully selected in accordance with normal operating conditions as well as normal driving habits, and this speed can only be varied by a major service operation. The ultimate result is that the ratio between the relatively rotatable members is automatically changed at a fixed speed even though it may be desired to either retain a low ratio until a relatively high speed is reached in order to secure maximum acceleration or to maintain a direct drive when the drive shaft of the engine is rotating at a relatively slow speed. Consequently, it is a further object of this invention to impart some degree of flexibility to the automatic operation of the transmission mechanism, and this is accomplished herein by employing a construction wherein the speed or speeds at which the ratio between the relatively rotatable members is automatically changed can be varied from a predetermined maximum to unity by means under the control of the operator. In accordance with the present invention, the aforesaid means may be operated by a control positioned for convenient manipulation by the driver so that various different results may be readily secured by merely operating the control.

In addition to providing means responsive to the speed of the driven shaft for automatically varying the ratio between the latter and intermediate shaft, the present invention also contemplates means responsive to the speed of the prime mover for automatically connecting the intermediate shaft thereto. This latter feature cooperates with the former to materially simplify control of the vehicle, since by reason of the same, the vehicle may be controlled by merely regulating the speed of the prime mover.

Another object of this invention resides in the provision of manually controlled variable transmission mechanism between the drive shaft and intermediate shaft for varying the ratio between the latter shafts from zero to a predetermined maximum preferably greater than the maximum ratio capable of being secured by the automatic mechanism previously referred to and for also changing the direction of rotation of the driven shaft.

Another advantageous feature of this invention resides in the provision of a transmission of the type previously set forth wherein the automatic transmission mechanism is inoperative when the driven shaft is rotating in a reverse direction, and this is accomplished herein by providing means for automatically disconnecting the automatic transmission mechanism from the intermediate shaft upon manipulating the manually controlled means to effect a reverse rotation of the driven shaft.

Still another feature of this invention resides in the novel and relatively simple means provided for actuating the manually controlled transmission mechanism to effect either a change in the ratio between the driving and intermediate shafts or to effect a change in the direction of rotation of the driven shaft.

A further advantageous feature of this invention resides in incorporating an overrunning clutch in the transmission mechanism in such a manner that this clutch not only transmits torque from the transmission shaft to the driven shaft in the reverse direction, but also prevents overrunning of the driven shaft when the transmission mechanism is in high gear or when a direct drive is established between the two aforesaid shafts.

A further object of this invention resides in the provision of automatic transmission mechanism embodying a plurality of overrunning clutches arranged in the assembly in such a manner as to preclude rotation of the driven shaft in a reverse direction except when the manually operable transmission is in reverse gear. This feature is of particular importance when it is desired to park the vehicle on an incline, since it prevents accidental rearward movement of the vehicle.

A further advantageous feature of this invention resides in the provision of automatic transmission mechanism so constructed that an increase in torque occasioned, for instance, by encountering a grade will not necessarily cause a decrease in gear ratio until the driving torque is momentarily reduced either by releasing the clutch or closing the engine throttle. This feature renders the automatic ratio change optional to a certain extent, and this is desirable especially when ascending a long grade where continuous operation of the engine at a high speed in a reduced gear ratio is objectionable.

A still further feature of this invention resides in the novel means provided herein for insuring efficient lubrication of the several working parts of the transmission with the minimum amount of lubricant.

In addition to the foregoing, the present invention contemplates obtaining uniform operation of the automatic clutch between the prime mover and drive shaft by providing means for adjusting the travel of the clutch operating member to compensate for wear of the clutch lining.

The foregoing as well as other objects of the invention will be made more apparent as this description proceeds, especially when considered in connection with the accompanying drawings, wherein:

Figure 1 is a fragmentary side elevational view of a vehicle equipped with transmission mechanism constructed in accordance with this invention and illustrated partly in section;

Figure 2 is a longitudinal sectional view taken substantially on the line 2—2 of Figure 5;

Figure 3 is a cross sectional view taken on the line 3—3 of Figure 2;

Figure 4 is a sectional view taken substantially on the line 4—4 of Figure 3;

Figure 5 is a cross sectional view taken on the line 5—5 of Figure 2;

Figure 6 is a sectional view taken on the line 6—6 of Figure 5;

Figure 12 is a diagrammatic view illustrating the selective control for the automatic transmission mechanism;

Figure 13 is an elevational view illustrating the location of the control;

Figure 14 is a sectional view taken on the line 14—14 of Figure 2 illustrating the adjustment of the automatic clutch;

Figure 15 is a sectional view illustrating the control for the clutch adjustment;

Figure 17 is also a sectional view taken on the line 17—17 of Figure 2;

Figure 18 is a longitudinal sectional view through a slightly modified form of transmission taken substantially on the line 18—18 of Figure 19;

Figure 8:
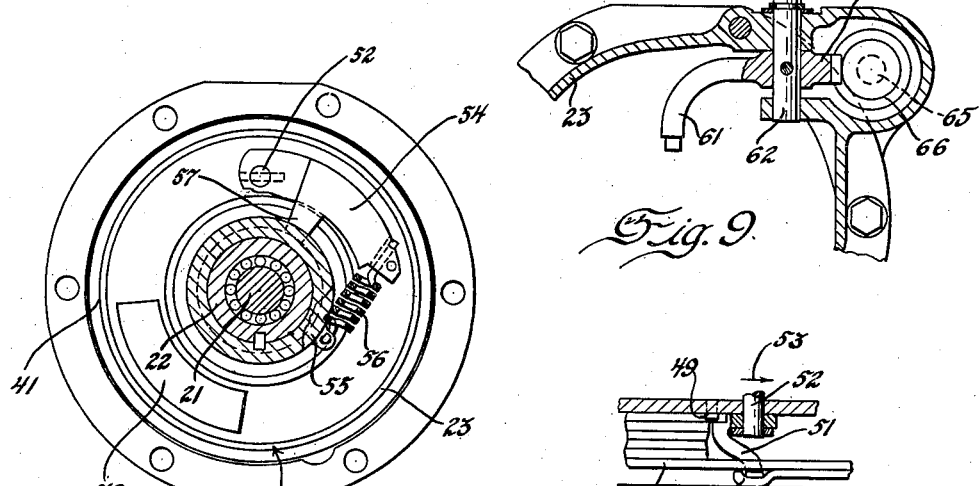
Figure 8 is a cross sectional view taken on the line 8—8 of Figure 2.
Figure 9:
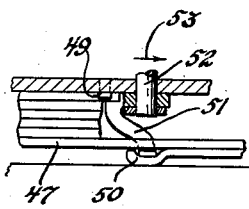
Figure 9 is a sectional view taken substantially on the line 9—9 of Figure 2.

Figure 19 in turn is a cross sectional view taken on the line 19—19 of Figure 18;

Figure 20 is a sectional view taken substantially on the line 20—20 of Figure 19.

Although it will be apparent as this description proceeds that the principles of the present invention may be employed in practically any instance where variation in torque is desired, nevertheless, these principles are especially desirable when employed in association with motor vehicles, and for this reason, I have shown my improved transmission as applicable to motor vehicles.

As shown particularly in Figure 2, the transmission comprises a drive shaft 20, an intermediate or transmission shaft 21 and a driven shaft 22. In the present instance, both the driving and driven shafts are journaled in a case 23 in axial alignment with each other, and the intermediate shaft 21 is disposed between the aforesaid shafts with the opposite ends suitably journaled in the adjacent ends of the latter shafts. As will be more fully hereinafter described, the intermediate shaft may be directly connected to the drive shaft for rotation therewith at the same speed, and the driven shaft is operatively connected to the intermediate shaft through the medium of the automatic transmission mechanism designated generally by the reference character 24.

The mechanism 24 is automatically controlled by the speed of the driven shaft for progressively increasing and decreasing torque respectively on and in proportion to decrease and increase in the speed of the driven shaft with a variation of the differential speed of the intermediate shaft and driven shaft from zero to a predetermined maximum. In detail, the mechanism 24 comprises a one-way clutch 25 having an inner member 26 freely rotatably mounted upon the intermediate shaft 21 and having an outer member 27 supported in concentric relation to the inner member by means of a plurality of rollers 28. The rollers 28 are interposed between the aforesaid members, in circumferential spaced relationship, and the engagement of the rollers with the adjacent surfaces of the members is such as to transmit torque to the outer member when the inner member is driven in a forward direction or in the direction of the arrow 29. The inner member 26 of the overrunning clutch is coupled to a gear 30 also freely rotatably mounted upon the intermediate shaft 21 and driven by the latter shaft at a reduced speed through the medium of the reduction gearing 31.

The reduction gearing 31 comprises a gear 32 splined upon the intermediate shaft 21 and arranged in constant mesh with the gears 33 and 34 which in turn are respectively journaled upon countershafts 35 and 36 suitably supported in the case 23. Mounted upon the countershafts 35 and 36 are the additional gears 37 and 38, respectively, adapted to mesh with the gear 30 hereinbefore described as freely rotatably mounted upon the intermediate shaft 21 and coupled to the inner member 26 of the overrunning clutch.

As shown particularly in Figure 5, the countershafts 35 and 36 are supported in the case 23 in such a manner that the pair of gears on each shaft mesh with the corresponding gears on the intermediate shaft at diametrically opposite sides of the latter. This arrangement is desirable in that it not only permits reducing the width of the gears to a minimum with the consequent reduction in over-all length of the transmission mechanism, but also provides for reducing the radial load upon the intermediate shaft to a minimum. In addition to the foregoing, the arrangement of gearing illustrated in Figure 5 materially facilitates lubrication of the reduction gearing, and the manner in which this is accomplished will be more fully hereinafter set forth. Attention may also be directed at this point to the fact that all of the aforesaid gears are of the spiral-toothed type so as to insure quiet operation.

From the foregoing, it will be observed that the outer member 27 of the one-way clutch 25 is capable of being driven from the intermediate shaft 21 through the reduction gearing and coupling between the latter and inner member of the clutch. The maximum differential speed between the outer member 27 of the clutch and intermediate shaft depends entirely upon the ratio of reduction through the gearing, and this ratio is carefully predetermined to provide the required increased torque necessary for all normal driving conditions. The coupling between the outer member 27 of the clutch and reduction gearing comprises a collar 39 mounted for sliding movement axially of the intermediate shaft and having internal teeth meshing with corresponding external teeth 40 formed on the gear 30 and inner member 26 of the clutch 25 in the manner clearly shown in Figure 2.

The outer member 27 of the one-way clutch 25 is splined within a hub 41 formed on the forward end of the driven shaft 22 so as to rotate the latter as a unit therewith and is normally held in assembled relation with the hub by means of a suitable snap ring 42 fixed in the forward end of the hub in advance of the member 27 of the clutch. With the construction as thus far described, it will be apparent that when the intermediate shaft 21 is directly connected to the drive shaft 20, the driven shaft will be rotated at a reduced speed from the intermediate shaft.

Figure 10:
Figure 10 is a fragmentary sectional view taken substantially on the line 10—10 of Figure 7.
Figure 16:
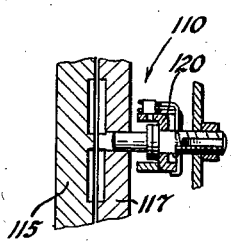
Figure 16 is a sectional view taken substantially on the line 16—16 of Figure 2.
Figure 7:
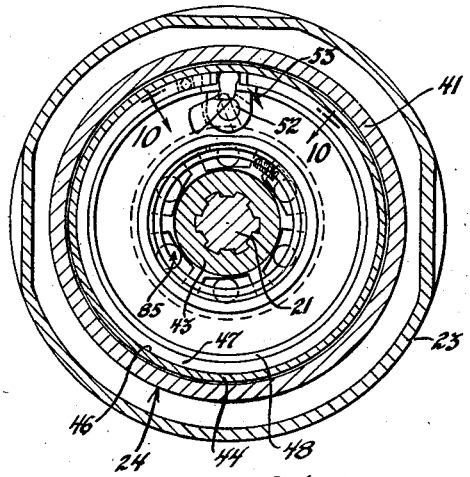
Figure 7 is a cross sectional view taken on the line 7—7 of Figure 2.
Figure 11:
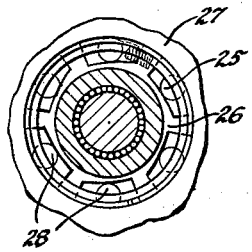
Figure 11 is a sectional view taken on the line 11—11 of Figure 2.

In order to drive the driven shaft at the same angular speed as the drive shaft, I provide means responsive to the speed of rotation of the driven shaft for directly connecting the same to the intermediate shaft. In detail, the means referred to above comprises a member 43 located within the hub 41 and splined upon the intermediate shaft 21 in rear of the one-way clutch 25. The periphery of the member 43 is provided with a rearwardly extending annular flange 44 concentrically arranged with respect to the axis of rotation of the hub and forming with a reduced portion 45 of the hub a substantially continuous annular clutch face 46 for engaging a suitable clutch designated generally by the reference character 47. The clutch 47 is in the form of a spiral spring coiled around an annular support 48 concentrically arranged with respect to the clutch face 46 and carried by the driven shaft 22. The support 48 is spaced inwardly from the clutch face 46 to such an extent that in the normal contracted position of the spring, the peripheral portions of the several convolutions are free from engagement with the clutch face 46. The rear end of the spring clutch 47 is anchored to the hub 41 on the driven shaft as at 49 in such a manner as to prevent rotation of the clutch relative to the hub 41, and the forward end of the spring clutch member is operatively connected in the manner shown in Figure 10 by the reference character 50 to a rock arm 51 in such a manner that rocking movement of the arm in one direction causes the spiral spring to expand into frictional engagement with the clutch face 46, and thereby establish a direct connection between the intermediate shaft and driven shaft through the member 43 on the former and the hub 41 on the latter. As shown particularly in Figure 2, the arm 51 is carried by a rockshaft 52 journaled in the hub 41 of the driven shaft with its axis substantially parallel to the axis of the latter so that a rocking movement of this shaft in the direction of the arrow 53 will effect the necessary swinging movement of the arm 51 to expand the clutch in the manner previously set forth. Owing to the driving connection between the outer member 27 of the one-way clutch 25 and driven shaft 22, it necessarily follows that when the latter is rotating at intermediate shaft speed, the angular speed of the outer member 27 exceeds the speed of the inner member 26 due to the fact that the latter is connected to the intermediate shaft through the reduction gearing, and this differential speed is permitted due to the fact that the rollers 28 provide for overrunning of the outer member 27 relative to the inner member 26.

As previously stated, the direct connection between the driven shaft and intermediate shaft is automatically effected in dependence upon the speed of rotation of the driven shaft. In order to accomplish this result, the clutch operating rockshaft 52 is actuated by a centrifugal weight 54 shown in Figure 8 as having one end connected to the rockshaft 52 and having the opposite end connected to a collar 55 through the medium of a coiled spring 56. The coiled spring 56 normally resists the action of centrifugal force to move the free end of the weight outwardly and thereby rock the shaft 52 to actuate the friction clutch, with the result that the speed at which the weight functions to operate the clutch depends to a certain extent upon the strength of the spring 56. Consequently, the speed at which centrifugal force operates the weight to in turn actuate the friction clutch may be varied by adjusting the tension of the spring 56, and this is accomplished herein by mounting the collar 55 to which the inner end of the spring 56 is secured on the driven shaft for limited axial sliding movement relative thereto. It will be understood from Figure 2 that movement of the collar 55 in a forward direction decreases the tension on the spring or, in other words, reduces the speed of the driven shaft required to effect the desired operation of the centrifugal weights or friction clutch, and that movement of the collar in the reverse direction increases the tension of the spring to proportionately increase the speed of the drive shaft required to actuate the centrifugal weights or clutch 47. In this connection, attention may also be called to the fact that provision is made herein for locking the weights in their outermost position and thereby prevent the release of the clutch 47 irrespective of the speed of the driven shaft. This is accomplished in the present instance by forming a depending projection 57 on the weight 54 intermediate the ends thereof and fashioning the inner end of the projection to form an inclined cam face 58 for engaging a corresponding face 59 on the collar 55 when the latter is moved to its fullest extent forwardly relative to the driven shaft. The speed of the driven shaft at which the ratio between the latter and intermediate shaft is changed or, in other words, adjustment of the collar 55 is controlled from a point conveniently located in the driver's compartment of the vehicle, and the manner in which this is accomplished will be made more apparent as this description proceeds.

Assuming that the intermediate shaft is directly connected to the drive shaft for rotation therewith at the same speed, and that the driven shaft has not attained the necessary speed required to operate the clutch 47 by the weights, it will be noted that the driven shaft will be rotated at the reduced speed determined by the reduction gearing 31. The driven shaft continues to rotate at reduced speed until the torque has decreased sufficiently to permit the increase in speed of the driven shaft required to build up sufficient centrifugal force in the weight 54 to counteract the spring 56 and move the free end of the weight outwardly. Outward movement of the weight 54 under the action of centrifugal force causes a rocking movement of the shaft 52 and associated arm 51 in the direction of the arrow 53 to expand the spring clutch member 47 into frictional engagement with both the hub 41 on the driven shaft and member 43 on the intermediate shaft. Inasmuch as the intermediate shaft is rotating at drive shaft speed and the member 43 is fixed thereto, it necessarily follows that the driven shaft is rotated at the same speed. It being understood that the action of the clutch to establish the connection previously set forth is gradual so as to insure smooth operation. The driven shaft 22 will continue to rotate at the speed of the intermediate shaft 21 until the torque requirements reduce the speed of the driven shaft to such an extent that the force exerted on the free end of the weight 54 by the spring 56 exceeds the centrifugal force counteracting the spring, and the latter tends to release the clutch 47 by moving the weight inwardly. Actual releasing of the clutch may be prevented, however, by the driving torque transmitted through the clutch, and if such is the case, the latter torque may be momentarily released by closing the throttle to the engine or disconnecting the latter from the driven shaft. The tendency for the driving torque to maintain direct drive irrespective of the speed of the driven shaft is advantageous rather than objectionable, since, in many instances, it may not be necessary or desirable to reduce the ratio. However, as soon as the clutch 47 is released, the driven shaft is again rotated from the intermediate shaft through the reduction gearing, with the result that the torque at the drive shaft is increased, and the speed of the latter is decreased. Thus, it will be apparent that I have provided means automatically controlled by the driven shaft for increasing and decreasing torque respectively on and in proportion to increase and decrease in speed of the driven shaft.

As explained above, it is objectionable to permanently fix the speed of the driven shaft at which the same is directly connected to the intermediate shaft for rotation as a unit therewith and to permanently fix the speed at which the aforesaid means is automatically released to drive the driven shaft from the intermediate shaft through the reduction gearing. In accordance with the present invention, means is provided under the control of the operator for adjusting the tension of the spring 56 through the medium of the collar to vary the speed or speeds at which the ratio between the aforesaid shafts is changed from a predetermined maximum to unity. As shown particularly in Figure 2, the collar 55 is formed with an annular groove 60 for engaging the free end of a lever 61 rockably supported upon a vertical shaft 62 in such a manner that rocking movement of the lever about the axis of the shaft 62 in a rearward direction effects a corresponding sliding movement of the collar 55 relative to the driven shaft 22 to increase the tension of the spring 56. On the other hand, movement of the lever 61 in the opposite direction causes the collar 55 to slide forwardly on the driven shaft 22 and thereby decrease the tension of the spring 56. Rocking movement of the lever 61 to effect the above adjustment of the collar, is accomplished herein by a suitable control 63 conveniently located for manipulation by the driver and operatively connected through a system of linkage 64 to a shaft 65 having a gear 66 thereon adapted to mesh with a gear segment 67 carried by the lever 61. The above arrangement is shown diagrammatically in Figure 12 and is such that movement of the control 63 in opposite directions effects a rocking movement of the shaft 65 in corresponding directions, and through the gearing 66 and 67 provides the required rocking movement of the lever 61 to shift the collar 55 upon the driven shaft. Although the control 63 may be located in any convenient position in the driver's compartment, nevertheless, I have shown the same for the purpose of illustration herein as positioned upon the steering wheel 68 for oscillation about the axis of rotation of the wheel. This arrangement permits extending a part of the operative connection between the lever 61 and control 63 through the steering post supporting the wheel 68. If desired, a suitable quadrant 69 may be provided in association with the control 63 graduated in miles per hour so as to facilitate obtaining the desired results from the automatic mechanism hereinbefore described.

The above construction is such that if it is desired to secure maximum torque until a relatively high speed is obtained, the driver merely moves the control 63 to the particular speed it is desired to change from the low gear ratio to the high gear ratio. For example, if it is desired to effect the above change at thirty miles an hour, the driver merely moves the control 63 to the proper position relative to the quadrant 69 whereupon the tension of the spring 56 is automatically adjusted through the medium of a collar 55 to prevent the weight 54 from moving outwardly under the action of centrifugal force to engage the clutch 47 until a speed of approximately thirty miles an hour is reached. However, it may not be desired to change from high gear to low gear when the speed of the vehicle drops below thirty miles an hour, and although the driving torque through the clutch 47 may be sufficient to prevent this action unless the same is reduced by either releasing the accelerator pedal or disconnecting the drive shaft from the source of power, nevertheless, the aforesaid change in gear ratio may be positively prevented by moving the control 63 back to a lesser speed so as to reduce the tension of the spring 56. Movement of the control 63 relative to the quadrant to indicate a lesser speed on the latter effects a movement of the collar 55 in a forward direction to decrease the tension of the spring 56 so that the weight 54 will be maintained in its outermost position until the speed of the driven shaft drops below the speed indicated by the control on the quadrant, whereupon the strength of the spring will be sufficient to draw the free end of the weight inwardly and release the clutch 47. In some cases, it may be desired to maintain the automatic transmission mechanism in high gear irrespective of the speed of rotation of the driven shaft, and this is accomplished by moving the control 63 to the zero position on the quadrant wherein the free end of the weight is permanently held in its outermost position by the cooperating engaging cam surfaces 58 and 59 on the weight and collar respectively. Thus, from the foregoing, it will be apparent that the operator may readily vary the speed at which the gear ratio is automatically changed from zero to a predetermined maximum by merely manipulating the control 63.

In order to place the automatic transmission mechanism previously described in dynamic balance, some means must be provided for counterbalancing the weight 54 and associated parts. This is accomplished herein by providing a member 70 having a weight equivalent to the weight of the parts it is desired to counterbalance and securing this member to the hub 41 at the side of the axis of the latter diametrically opposite the aforesaid parts.

In relatively light weight vehicles, the torque requirements are not exceedingly high, and in some cases, the automatic transmission mechanism previously referred to may be sufficient in itself to produce the required torque variations for all driving conditions in which event the intermediate shaft 21 may be permanently coupled with the drive shaft 20. However, abnormal driving conditions with the heavier types of vehicles may require an increase in torque above that capable of being produced by the lowest automatic gear ratio, and in order to take care of these abnormal conditions, I provide a reduction between the driving and intermediate shafts substantially lower than the reduction 31 between the latter and driven shaft. This reduction may be accomplished automatically by substantially the same mechanism previously described in so far as construction is concerned, but in view of the fact that it is only necessary to use the same under abnormal conditions, I have shown this reduction as manually controlled.

The manually controlled transmission mechanism between the drive shaft 20 and intermediate shaft 21 comprises a gear 71 fixed upon the drive shaft and arranged in constant mesh with a relatively larger gear 72 mounted on the countershaft 73. The countershaft 73 is journaled in any suitable manner in the case 23 and has mounted thereon another gear 74 rotatable as a unit with the gear 72. The gear 74 is arranged in constant mesh with a gear 75 freely rotatably mounted upon the rear end of the drive shaft and having external clutch teeth 76 for engagement with corresponding internal clutch teeth 77 carried by the low speed gear 78. The low speed gear 78 is splined upon the intermediate shaft 21 for axial movement relative thereto so that engagement of the internal clutch teeth 77 carried thereby with the clutch teeth 76 on the freely rotatable gear 75 operatively connects the intermediate shaft to the drive shaft through the reduction gearing referred to above. In this connection, it is to be noted that all of the intermeshing gears of the last named reduction train are of the spiral type so as to insure quiet operation, and the relative sizes of the gears is such as to provide a reduction substantially lower than the reduction secured by the gearing 31.

As shown particularly in Figure 2, the low speed gear is provided with a second set of clutch teeth 79 spaced forwardly from the clutch teeth 77 and adapted to mesh with internal clutch teeth 80 formed on the inner surface of the counterbored rear end of the drive shaft 20 so as to establish a direct connection between the latter and intermediate shaft 21 when the reduction gearing between the latter shafts is inoperative or, in other words, when the low speed gear 78 is in its normal position shown in Figure 2. As will be observed from this latter figure, the foregoing construction is such that movement of the low speed gear 78 axially of the intermediate shaft 21 in a forward direction from the normal position thereof disengages the clutch teeth 79 and 80 and engages the clutch teeth 77 and 76 so as to rotate the intermediate shaft at a reduced speed from the drive shaft. Inasmuch as the intermediate shaft is connected to the driven shaft through the medium of the automatic transmission mechanism hereinbefore described including the reduction gearing 31, it necessarily follows that the torque is again multiplied before being transmitted to the driven shaft. Thus, it will be apparent that it is possible to obtain a double reduction between the drive and driven shafts to meet extremely high torque demand. It will, of course, be understood that if the speed of the driven shaft under the double reduction becomes sufficient to actuate the clutch 47 by the centrifugal weight 54, the reduction gearing 31 will be rendered inoperative and the driven shaft will rotate at the reduced speed of the intermediate shaft 21.

When it is desired to directly connect the intermediate shaft to the drive shaft, the low speed gear 78 is merely moved rearwardly from the position aforesaid thereof until the clutch teeth 79 carried thereby mesh with the clutch teeth 80 formed on the drive shaft. When the low speed gear is in this latter position, the transmission operates in the manner set forth above and is thoroughly automatic.

In order to reverse the direction of rotation of the driven shaft, I provide a reverse idler gear 81 shown in Figure 4 as slidably mounted upon a stub shaft 82 and operable in one position to mesh with a gear 83 carried by the countershaft 73 for rotation as a unit with the gears 72 and 74. Upon movement of the gear 81 axially of its shaft 82 in a forward direction into mesh with the gear 83, the low speed gear 78 is moved rearwardly with respect to the intermediate shaft 21 into mesh with the idler gear 81 so that the intermediate shaft will be driven by the drive shaft in a direction opposite to the direction of rotation of the latter or, in other words, in the direction of the arrow 84 shown in Figure 2. At the same time that the gears 78 and 81 are moved in opposite directions into intermeshing relationship, the collar 39 is shifted forwardly from its position shown in Figure 2 to such an extent as to disengage the inner member 26 of the overrunning clutch 25 from the reduction gearing 31 and thereby render the automatic transmission mechanism inoperative to effect a change in ratio between the intermediate shaft and driven shaft.

In reverse drive, the driven shaft is rotated at the same speed as the intermediate shaft, and this is accomplished herein by a second one-way roller clutch 85 interposed between a portion of the hub 41 on the driven shaft and a portion of the member 43 splined to the intermediate shaft. The clutch 85 differs in construction from the clutch 25 in that the same will permit overrunning of the intermediate shaft in the forward direction designated by the arrow 29, but will establish a direct drive between the latter shaft and driven shaft when the same are rotating in the reverse direction designated by the reference character 84. It will be apparent from the above that the centrifugal clutch will have no effect in the reverse drive even though the speed of the driven shaft should exceed that required to actuate the weights, since both the hub 41 and member 43 are rotating at the same angular speed through the one-way clutch 85.

Inasmuch as the clutch 25 transmits torque to the driven shaft when rotation is in a forward direction, and in view of the fact that the clutch 85 transmits torque to the driven shaft in the opposite direction, it necessarily follows that overrunning of the driven shaft in direct drive will be prevented. Another result obtained by this structure is that unless the transmission is in the reverse drive position, backward motion of the vehicle is absolutely prevented. This inherent feature of my transmission mechanism is desirable in that it permits parking the vehicle on a steep grade without the danger of the same rolling backward.

In accordance with the present invention, movement of the low speed gear 78, reverse gear 81 and collar 39 is effected by a single control member 86 conveniently located in the driver's compartment for manipulation by the operator. As shown in Figure 1, the control comprises a reciprocable plunger 87 having the lower end connected to a rockshaft 88 through the medium of a link 89 in such a manner that upward movement of the plunger effects a rocking of the shaft in one direction, and downward movement of the plunger causes the shaft to rock in the opposite direction. The shaft 88 is journaled in the side of the case 23 and has secured to the inner end thereof within the case an arm 90 extending transversely of the axis of rocking movement of the shaft. The lower end of the arm 90 is operatively connected to the reverse gear as at 91, while the upper end of the arm is connected to a shift rail 92 mounted for axial movement in any suitable manner within the transmission case. The shift rail 92 is operatively connected to the low speed gear for sliding the latter axially of the intermediate shaft by means of the yoke 93 having the inner end connected to the low speed gear and having the outer end secured to the shift rail. With the construction as thus far described, it will be noted that movement of the plunger 87 to its uppermost position shown in Figure 1 causes the low speed gear 78 to move forwardly relative to the intermediate shaft 21 to mesh the clutch teeth 77 thereon with the clutch teeth 76, and thereby connect the intermediate shaft to the drive shaft through the reduction gearing which may be termed "emergency low" if desired. Downward movement of the plunger 87 from the aforesaid position thereof to the full line position of the same shown in Figure 1 effects a rearward movement of the low speed gear to mesh the clutch teeth 79 on the latter with the clutch teeth 80 on the drive shaft to establish a direct driving connection between the drive and intermediate shafts. Continued downward movement of the plunger 87 to the position thereof designated by the reference character 94 in Figure 1 effects the required rearward movement of the low speed gear to render both sets of clutch teeth inoperative or to place the transmission in neutral. In the aforesaid movements of the low speed gear, the reverse idler 81 and the collar 39 are also moved, but the construction is such that in all of these positions, the collar 39 maintains the connection between the reduction gearing and inner member of the overrunning clutch 25, and the reverse idler gear 81 remains free from engagement with any of the driving gears. This latter feature is desirable since it restricts rotation of the gear 81 to reverse drive only, and thereby not only minimizes the wear on the gearing, but also eliminates objectionable gear noises. However, downward movement of the plunger 87 to the position thereof designated by the reference character 95 in Figure 1 effects the movement of both gears 78 and 81 required to intermesh the same with the gear 83 on the countershaft to effect reverse drive.

It has been previously stated that the collar 39 is moved forwardly to such an extent as to release the reduction gearing from the inner clutch member 26 of the one-way clutch 25 when the reverse gearing is in operation, and in order to accomplish this release automatically, the collar is connected to the rail 92. The means operatively connecting the collar to the aforesaid rail comprises a second rail 96 slidably mounted in the transmission case with its axis substantially parallel to the axis of the rail 92 and connected at one end to the collar 39 by means of a fork 97. Movement is imparted to the rail 96 from the rail 92 by means of an arm 98 pivotally connected intermediate the ends in the transmission case and having the opposite ends thereof respectively connected to the aforesaid rails. The leverage is such that when the low speed gear 78 is moved to its reverse drive position, the collar 39 is moved forwardly to such an extent as to disengage the inner member 26 of the one-way clutch 25 from the reduction gearing 31. As indicated above, in all other positions of the low speed gear, the connection between the reduction gearing and inner member 26 of the one-way clutch 25 is maintained by the collar 39.

In order to definitely locate the plunger 87 in any one of the aforesaid positions thereof, suitable circular openings 99 are formed through diametrically opposite sides of the plunger for receiving a pair of balls 100. The balls 100 are of such diameter as to be freely insertable within the openings 99 and are adapted to engage in suitable semi-circular recesses 101 formed in the inner surface of the support 102 for the reciprocating plunger 87. The axial spacing of the recesses 101 in the support is carefully predetermined so that in each position of the plunger, the balls register with the recesses 101. Moreover, the dimension of the recesses 101 is such as to receive the balls when the same register therewith and thereby prevent accidental movement of the plunger relative to the support. The balls are normally maintained in their outermost positions by means of a pin 103 telescoped within the plunger to assume a position opposite the balls in the manner shown in Figure 1, and having an annular groove 104 spaced above the balls. The groove 104 is of such dimension that when the same is positioned opposite the balls, the latter are permitted to move inwardly a sufficient distance to afford unobstructed sliding movement of the plunger in the support. The pin 103 is normally urged in a position wherein the groove 104 is out of registration with the balls by means of a spring 105 encircling the upper portion of the pin beyond the plunger and housed within a suitable grip 106. As will be readily apparent from Figure 1, the lower end of the spring reacts upon the upper end of the plunger 87, while the upper end of the spring engages an enlarged head portion 107 secured to the pin in such a manner as to normally extend above the grip 106 a distance substantially equal to the extent of movement of the pin necessary to register the groove with the balls. The above construction is such that when it is desired to move the plunger from one position to another, the operator merely depresses the enlarged head 107 on the pin 103 to locate the grooove 104 in registration with the balls 100 whereupon the plunger 87 may be moved to any desired position without interference from the balls.

In order to permit obtaining complete automatic operation of the transmission mechanism, I provide means responsive to the speed of the prime mover for operatively connecting the drive shaft 20 thereto, and this is accomplished herein by a centrifugally operated clutch 110. When the prime mover is idling, the centrifugally operated clutch is in its released position, and remains in this position until the prime mover is accelerated whereupon the clutch is actuated to directly connect the drive shaft 20 to the prime mover through the medium of suitable weights responsive to the speed of rotation of a part driven directly by the prime mover. Inasmuch as the centrifugally operated clutch is in its released position when the prime mover is idling, the intermediate shaft 21 may be directly connected to the drive shaft 20, and in view of the fact that the driven shaft is connected to the intermediate shaft through the medium of the automatic transmission mechanism 24, it necessarily follows that operation of the vehicle in a forward direction from a standstill may be controlled under all normal driving conditions by merely regulating the speed of the prime mover.

In detail, the automatic clutch comprises a clutch face 111 fixed to a part 112 which in turn is rotated directly by the prime mover at the speed of the latter. The clutch face 111 is adapted to engage the periphery of a spring disk 113 fixedly secured to the drive shaft 20 in any suitable manner for rotation therewith as a unit. Located upon the side of the disk 113 opposite the side upon which the clutch face 111 is positioned is a second clutch face 114 cooperating with the face 111 to clamp the disk therebetween and thereby rotate the drive shaft 20 at the same angular speed as the part 112 carried by the prime mover. The clutch face 114 in addition to rotating with the part 112 is also capable of axial movement toward and away from the latter. As shown particularly in Figure 2, the clutch face 114 is permanently secured to a ring 115 splined as at 116 to the part 112. Rotatable as a unit with the ring 115 but movable axially relative thereto is an annular actuating member 117 normally urged in a direction toward the ring 115 by means of suitable springs, one of which is shown in Figure 2 by the reference character 118. As pointed out above, the action of the springs 118 is to move the member 117 toward the ring 115 carrying the clutch face 114, and since this arrangement would tend to normally maintain the clutch in engagement in contradistinction to the above statement that the clutch is normally in its released position, I provide means for counteracting the springs 118. This means comprises a sleeve 119 slidably carried by the drive shaft 20 for movement axially of the latter and engaging at the forward end the inner extremities of a plurality of circumferentially spaced fingers 120, only one of which is shown in Figure 2. As is usually the case, the clutch fingers 120 are rockably supported intermediate the ends upon the bolts 117' fixed relative to the actuating member 117, and the extreme upper ends of the fingers engage a shoulder 121 on the member 117 in such a manner that movement of the sleeve 119 forwardly causes a rearward movement of the member 117 against the action of the springs 118. The sleeve 119 is normally maintained in a position wherein the clutch is released by means of an abutment designated generally in Figure 14 by the reference character 122.

As pointed out above, the clutch is engaged in dependence upon the speed of rotation of the part 112 directly connected to the prime mover, and for accomplishing this result, I provide a plurality of centrifugal weights 123, only one of which is shown in Figure 2. The weights 123 are secured to the rear ends of suitable pins 124 having the forward ends projecting through openings formed in the member 117 and terminating in inwardly extending projections 125. As shown particularly in Figure 2, the front surface of the projections 125 abuts the ring 115, while the rear surface thereof abuts the actuating member 117. The springs 118 serve to hold the weights 123 in their innermost positions or in the positions thereof shown in Figure 2, and the construction is such that when the speed of the part 112 extends a predetermined maximum, the weights 123 will move outwardly under the action of centrifugal force. Outward movement of the weights 123 causes the projections 125 to assume an angular position between the ring 115 and member 117, and, in assuming this position, imparts the required forward movement of the ring 115 to clamp the periphery of the disk 113 between the clutch surface 114 on the ring and the clutch surface 111 on the part 112. It will, of course, be apparent that when the speed of the member 112 falls below the predetermined maximum mentioned above, the centrifugal force is relieved to such an extent as to permit the disk 113 to slip between the clutch surfaces and thereby release the drive shaft from the prime mover.

In order to provide for efficient operation of the automatic clutch previously described, the extent of relative movement of the cooperating clutch faces to engage the clutch should remain the same irrespective of wear on these surfaces. In accordance with the present invention, the sleeve 119 is adjusted rearwardly axially of the drive shaft 20 to compensate for wear on the cooperating clutch surfaces, and this is accomplished by raising or lowering the abutment 122 from a position conveniently located in the driver's compartment. In this connection, it is to be noted that the abutment 122 comprises an inverted U-shaped member 126 fashioned to straddle the drive shaft 20 in rear of the sleeve 119. The legs of the U-shaped member 126 are tapered as at 127 to form cam faces for engaging suitable projections 128 formed on the rear face of the sleeve 119 on diametrically opposite sides of the drive shaft. The projections 128 are normally yieldably maintained in engagement with the cam faces on the legs of the U-shaped member 126 by the action of the springs 118 on the actuating member 117. With the construction as thus far described, it will be apparent that movement of the inclined surfaces 127 on the member 126 upwardly relative to the projections 128 permits a corresponding rearward movement of the sleeve 119 to decrease the clearance between the cooperating clutch surfaces. The abutment 122 is adjusted from the driver's compartment by means of a plunger 129 operatively connected to the member 126 by means of the flexible cable 130 in such a manner that outward movement of the plunger from its innermost position imparts the desired movement of the member 126 upwardly relative to the sleeve 119. As shown particularly in Figure 15, the plunger is reciprocably mounted in a casing 131 having a shoulder 132 intermediate the ends thereof for engaging an abutment 133 on the plunger to accurately locate the plunger in the position providing the desired adjustment of the sleeve 119. The abutment 133 on the plunger is adjustable and is in the form of a snap ring selectively engageable in a plurality of grooves 134 formed in the plunger 129. The abutment 133 is so located upon the plunger 129 that when the former is in engagement with the shoulder 132, the sleeve 119 assumes its proper adjusted position wherein the desired clearance is provided between the cooperating clutch surfaces. In this connection, it is to be noted that when it is desired to adjust the sleeve 119 rearwardly to compensate for wear on the aforesaid clutch surfaces, the plunger is withdrawn from the casing 131 and the abutment or snap ring 133 is moved in the direction toward the inner end of the plunger in the next adjacent groove 134 therein so that when the plunger is again assembled with the casing, the extent of inward movement thereof will be less than before adjustment of the snap ring.

The above construction also offers the possibility of operating the centrifugal clutch manually, since outward movement of the plunger 129 to the dotted line position thereof shown in Figure 15, releases the abutment 124 from engagement with the sleeve 119 and permits the springs 118 to move the sleeve rearwardly to such an extent as to cause engagement of the cooperating clutch surfaces. When this condition exists, the drive shaft is normally operatively connected to the prime mover so that the intermediate shaft must be either disconnected therefrom or the clutch manually disengaged before starting the prime mover. In the present instance, the clutch may be manually disengaged in the usual manner by means of a rockshaft 135 journaled in any suitable manner in the case and having projections 136 fixed thereto for engaging the rear end of the sleeve 119 on opposite sides of the drive shaft 20. The arrangement is such that rocking movement of the shaft 135 in a forward direction imparts a corresponding axial movement to the sleeve 119 to disengage the cooperating clutch surfaces permitting manipulation of the manually operable transmission mechanism to either directly connect the intermediate shaft to the drive shaft or indirectly connect said shaft through the reduction gearing.

Complete operation

When the clutch 110 is used for automatic operation, the abutment 122 behind the clutch throw-out sleeve 119 is in such position that the clutch is released when the engine is not running or is idle. As the speed of the engine is increased, the centrifugal weights 123 are forced outwardly by centrifugal force causing the drive shaft 20 to be gradually connected to the prime mover through the action of the cooperating clutch surfaces on the flexible disk 113 carried by the drive shaft. The drive shaft is then rotating at engine speed, and inasmuch as the same is normally directly connected to the intermediate shaft 21 through the cooperating clutch teeth 79 and 80 respectively on the low speed gear 78 and drive shaft, the intermediate shaft will also be rotated at engine speed. From the intermediate shaft 21, torque is transmitted to the driven shaft 22 through the medium of the automatic transmission mechanism 24 including the reduction gearing 31. As the torque demand at the driven shaft 22 decreases, the speed of the latter increases, and when this speed exceeds the setting of the control 63, the centrifugal force generated by the weight 54 is sufficient to overcome the action of the spring 56 and directly couple the driven shaft to the intermediate shaft through the medium of the clutch 47. When the torque at the driven shaft increases to such an extent as to cause a decrease in the speed of the driven shaft below that indicated by the control 63, the spring 56 tends to move the weight 54 inwardly to disengage the clutch 47, but under ordinary circumstances, this action is prevented until the driving torque is momentarily released by either disengaging the drive shaft 20 from the source of power or momentarily decreasing the engine speed. Releasing the driving torque by either of the above methods will cause a movement of the clutch 47 to its inoperative position wherein the driven shaft is again rotated from the intermediate shaft through the reduction gearing.

The foregoing is the operation of the transmission mechanism under normal driving conditions, but in the event the torque demand at the driven shaft exceeds that capable of being produced by the reduction gearing 31, the reduction gearing between the drive and intermediate shafts is rendered operative by movement of the low speed gear forwardly from the position thereof shown in Figure 2 to engage the cooperating clutch teeth 76 and 77 after the master clutch has been released. A double reduction is then provided between the drive and driven shafts to take care of the increased torque requirements. Inasmuch as the double reduction goes through the centrifugally operated clutch 47, it will be apparent that in the event the speed of the driven shaft exceeds that required to operate the clutch 47 by the weight 54, then the driven shaft will be rotated at the ratio of the reduction gearing between the drive and intermediate shafts. The manner in which reverse drive is obtained is clearly defined above, and further reference to the same at this point is believed unnecessary.

It has been previously pointed out that the present invention contemplates efficiently lubricating the reduction gearing 31 which is located relatively high in the gear case without correspondingly increasing the level of the lubricant in the gear case. As shown in Figure 5, the oil level in the case is predetermined in relation to the lowermost gear 33 in the train 31 so that the teeth on the latter gear will act to collect the lubricant and convey the same upwardly through the relatively small passage 140 provided by the space between the aforesaid gear and adjacent side wall of the case. The oil carried upwardly through the passage 140 is thrown upon a baffle 141 extending over the intermediate gear 32 of the train and is directed by this baffle against the gear 34 whereupon the oil is conducted through the relatively narrow passage 142 between the gear and adjacent side wall of the case onto a suitable lip 143 formed on the case in the manner clearly shown in Figure 5. The lip is so designed as to collect the lubricant flowing downwardly through the passage 142, and the teeth on the gear 34 operate to pick up the lubricant thus collected and distribute the same over the teeth of the intermediate gear 32. With this arrangement, it will be seen that even though a number of the gears are spaced a considerable distance from the bottom of the case, nevertheless, the oil level need not be abnormally high, and, as a consequence, leakage is reduced to the minimum.

Referring now more in detail to the modified form of the invention illustrated in Figures 18 to 20, inclusive, it will be noted that the transmission mechanism shown in these figures is more compact and less costly than the transmission mechanism hereinbefore described. In the present embodiment of the invention, the drive shaft 150 corresponding to the shaft 20 in the foregoing modification is journaled at the rear end in the hub 41' at the forward end of the driven shaft 22', and the latter is connected to the shaft 150 through the medium of automatic transmission mechanism 24' identical in operation to the automatic transmission mechanism 24 referred to above with the exception that the reduction gearing 31 described in the first form of the invention is eliminated. The function of the reduction gearing 31 in the first described form of the invention is accomplished in the present instance by certain parts of the emergency or manually operable transmission mechanism designated generally by the reference character 151.

In detail, the drive gear 71' on the shaft 150 is connected to a gear 75' freely rotatably mounted upon said shaft through the medium of gears 72' and 74' respectively meshing with the gears 71' and 75'. Both the gears 72' and 74' are mounted for rotation as a unit upon a countershaft 73' journaled in any suitable manner in the case 23'. With this construction, it will be seen that the gear 75' will be driven at a reduced speed from the gear 71', and in the present instance, the former gear is provided with a forwardly extending sleeve 152 corresponding in certain respects to the intermediate driven member 21 of the first described transmission. The sleeve 152 is formed with clutch teeth 153 on the rear end thereof adapted to be connected to corresponding clutch teeth 154 formed on the inner member 26' of the one-way clutch 25' through the medium of an axially slidable collar 155. The above construction is such that when the collar 155 is in the position thereof shown in Figure 18 or, in other words, in a position wherein the gear 75' is directly connected to the inner member 26' of the one-way clutch 25', the driven shaft 22' will be driven at the reduced speed of the gear 75' through the medium of the clutch 25'. The differential speed between the driven shaft and gear 75' is changed from the predetermined maximum set forth above to zero in the same manner as defined in connection with the first described form of the invention by the action of the centrifugal clutch 47'. In order to obtain emergency low through the manually operable transmission mechanism 151, I provide a low speed gear 156 freely rotatably mounted upon the sleeve 152 and adapted to be driven by a gear 157 supported upon the countershaft 73' for rotation as a unit with both the gears 72' and 74'. The gear 157 is operatively connected to the gear 156 through the medium of an idler gear 158 meshing with the gear 157 and with a gear 159 which in turn meshes with the low speed gear 156. The gear 159 is mounted for sliding movement upon a stub shaft 160 for movement into and out of mesh with the gears 156 and 158 to disconnect the former gear from the drive gear 157. The arrangement is such that when the gear 159 is in mesh with both of the gears 156 and 158, the former gear is rotated in a forward direction at the ratio provided, and in order to drive the driven shaft 22' at the speed of the gear 156, the outer member 27' of the clutch 25' is directly connected to the gear 156. This is accomplished in the present instance by moving the collar 155 rearwardly from the position thereof shown in Figure 18 to engage the clutch teeth 161 on the rear end of the collar with corresponding clutch teeth 162 on the outer member 27' of the overrunning clutch and engaging the clutch teeth 163 on the rear end of the collar with the corresponding clutch teeth 164 formed on the gear 156. It will, of course, be understood that when the collar 155 is in its emergency low gear position, the clutch teeth 153 on the gear 75' will be released from the inner member 26' of the clutch 25'. Inasmuch as the outer member 27' of this clutch is directly connected to the hub 41' of the driven shaft, it necessarily follows that the latter will be driven at the speed of the gear 156. In order to permit driving the driven shaft 22' in a reverse direction, I provide a reverse gear 165 freely rotatably mounted upon a stub shaft 166 for movement axially of the latter into mesh with both the low speed gears 156 and 157 hereinbefore described. The gear 156 may then be directly connected to the outer member 27' of the clutch 25' to rotate the driven shaft 22' in the reverse direction. In connection with the reverse gearing referred to above, it will be noted that the torque is not transmitted to the driven shaft through the overrunning clutch 85' as in the first described form of the invention, and, as a consequence, this clutch merely cooperates with the clutch 25' to prevent overrunning of the driven shaft or freewheeling of the vehicle in forward speeds.

Referring now to the means provided herein for effecting the required relative movements of the several sliding parts to effect either automatic, emergency low or reverse operation, it will be noted from Figure 19 that I provide two shift rails 167 and 168. Both the rails are selectively operated in the usual manner by means of a gear shift lever 169 universally supported as at 170 in the conventional transmission tower 171 and having the lower end adapted to engage either of the rails.

The rail 168 is operatively connected to the collar 155 for sliding the same axially of the shaft 150 through the medium of a shifter fork 172 so arranged that when the lever 169 is in its neutral position, the collar 155 positively connects the gear 156 to the outer member 27' of the overrunning clutch 25'. The rail 167, on the other hand, is connected at one side to the low speed gear 159 through the medium of a lever 173 and at the opposite side to the reverse gear 165 through the medium of a lever 174. Although with the above arrangement movement of the rail 167 in one direction effects a corresponding movement of both the aforesaid gears in the opposite direction, nevertheless, the construction is such that one of the gears will mesh with the low speed gear 156 when the rail 167 is moved in one direction and the other of the gears will mesh with the low speed gear 156 when said rail is moved in the opposite direction. In the specific embodiment of the invention, the gear 159 is normally positioned adjacent the front side of the low speed gear 156, and the reverse gear 165 is normally located at the reverse side of the low speed gear so that movement of the rail 167 in the direction of the arrow 175 will effect a movement of the gear 159 into mesh with the low speed gear, and movement of the rail in the opposite direction will cause the gear 165 to mesh with the low speed gear.

As hereinbefore stated, the collar 155 is normally in a position wherein the low speed gear is directly connected to the driven shaft through the outer member 27' of the clutch 25' so that this collar need not be disturbed when it is desired to go either into low speed or reverse from a neutral position. In the event it is desired to connect the driven shaft to the source of power through the automatic transmission, the shift rail 168 is merely moved in a forward direction from the neutral position aforesaid to locate the collar in the position shown in Figure 18. If the operator desires to go into either emergency low or reverse when the collar is in the position thereof shown in Figure 18, the lever 169 is first moved to its neutral position in order to directly connect the low speed gear with the outer member 27' of the clutch 25' through the collar 155 whereupon the lever may be moved to either the reverse or emergency low positions.

If desired, the transmission mechanism shown in Figures 18 to 20, inclusive, may also be used in association with an automatic clutch of the type set forth somewhat in detail in connection with the first described form of the invention in which event the connection between the prime mover and driven shaft may be effected at different gear ratios by merely controlling the speed of the prime mover. In the event an automatic clutch is employed in association with the transmission mechanism shown in the latter embodiment of the invention, the collar 155 may be normally maintained in the position thereof shown in Figure 18 wherein the driven shaft is connected to the prime mover through the automatic mechanism.

What I claim as my invention is:

1. In a variable speed transmission mechanism, the combination with a driven member and a member rotatable relative thereto, of reduction gearing between the two members, a friction clutch also between said members for directly connecting the same, means responsive to the speed of and the load on the driven member for actuating said clutch, means permitting the driven member to overrun said reduction gearing when the same is rotating at the angular speed of the other member through the action of said clutch, and means acting directly on said clutch actuating means for varying the speed at which said clutch actuating means operates to directly connect the driven member to the other of said members.

2. In a variable speed transmission mechanism, the combination with a driving member, a driven member and an intermediate member, means between the driving and intermediate members for selectively rotating the latter in opposite directions, variable transmission means between the intermediate member and driven member, said last named means including reduction gearing driven by the intermediate member, a one-way clutch between the reduction gearing and driven member for transmitting torque to the latter when the intermediate member is rotated in one direction, and means for releasing the reduction gearing from said overrunning clutch upon actuation of the first named means to rotate the intermediate member in the opposite direction.

3. In a variable speed transmission mechanism, the combination with a driving member, a driven member and an intermediate member, means between the driving and intermediate members for selectively rotating the latter in opposite directions, variable transmission means between the intermediate member and driven member, said last named means including reduction gearing driven by the intermediate member, a one-way clutch between the reduction gearing and driven member for transmitting torque to the latter when the intermediate member is rotated in one direction, means for releasing the reduction gearing from said overrunning clutch upon actuation of the first named means to rotate the intermediate member in the opposite direction, and a second overrunning clutch between the intermediate member and driven member operable to transmit torque from the former to the latter upon rotation of the intermediate member in said last named direction.

4. In a variable speed transmission mechanism, the combination with a driven member, a second member mounted for rotation relative to the driven member and means for rotating said second member in opposite directions, of variable transmission means between the second member and driven member, said means including reduction gearing driven by said second member, an overrunning clutch connecting the reduction gearing to the driven member for transmitting torque to the latter through the reduction gearing upon rotation of the second member in one direction, means responsive to the speed of and the load on the driven member for automatically directly connecting the same to the second member, and a second one-way overrunning clutch between the driven member and second member for transmitting torque from the latter to the former when the second member is rotating in the opposite direction.

5. In a variable speed transmission, the combination with a driven member and a member rotatable relative to the driven member, of a toothed element mounted upon the second member for rotation relative thereto, reduction gearing operatively connecting said toothed element to the second member for rotating said element at a reduced speed from the latter member, another toothed element mounted for rotation relative to the second member, reduction gearing of a lower ratio than the gearing aforesaid connecting said second toothed element to said second named member, an overrunning clutch having the inner part freely rotatably mounted upon said second member and having the outer part directly connected to the driven member, and a shiftable collar operable in one position to connect the first named toothed element to the inner part of the overrunning clutch for transmitting torque through the latter to the driven member and operable in another position to directly connect the outer part of the overrunning clutch to the second named toothed element.

6. In a variable speed transmission, the combination with a driven member and a driving member, of a toothed element mounted upon the driving member for rotation relative thereto, reduction gearing connecting the toothed element to the driving member for rotating the former at a reduced speed from the latter, a second toothed element also mounted for rotation relative to the driving member, transmission gearing between the second toothed element and driving member for varying the ratio and the direction of drive of said second toothed element, an overrunning clutch freely rotatably mounted upon the driving member and connected to the driven member, and means for selectively connecting the first named toothed element to the driven member through the overrunning clutch and for directly connecting said driven member to the second named toothed element.

7. In a variable speed transmission mechanism, the combination with a driven member and a driving member, of a toothed element mounted upon the driving member for rotation relative thereto, reduction gearing connecting the toothed element to the driving member for rotating the former at a reduced speed from the latter, means operatively connecting the toothed element to the driven member for rotating the latter at the speed of said element including a one-way clutch, means responsive to the speed of the driven member for automatically connecting the same directly to the driving member, a second toothed element mounted for rotation relative to the driving member, manually controlled transmission means between the second toothed element and driving member for effecting a further reduction and for reversing the direction of drive, and means operable to disconnect the first named toothed element from the overrunning clutch and for connecting the second named toothed element to the driven member.

8. A power transmitting unit comprising, a rotatable element adapted to be directly connected to a source of power for rotation thereby, a driving member, a driven member and an intermediate member, means automatically controlled by the speed of the rotatable element for connecting the driving member thereto, manually controlled transmission means between said driving member and intermediate member including a plurality of forward speeds and a reverse, variable transmission means between the intermediate member and driven member automatically controlled by the speed of and the load on the driven member for varying the ratio of torque transmission to correspondingly vary the speed ratio between the intermediate member and driven member, and means under the control of the operator for varying the speed and load at which said variable transmission means operates to change the ratio of torque transmission between the intermediate member and driven member.

9. In a transmission mechanism, the combination with a rotatable member and a driven member, of variable transmission means between said rotatable member and driven member automatically controlled by the speed of and the load on the driven member, means under the control of the operator for varying the speed and load at which said transmission means operates to change the ratio between the rotatable member and driven member, said last named means also operable to render said transmission means inoperative to vary the ratio between the rotatable member and driven member irrespective of variations in the speed of and the load on the driven member.

10. In a transmission mechanism, the combination with a rotatable member and a driven member, of variable transmission means between the rotatable member and driven member including means controlled by the speed of and the load on the driven member for varying the ratio of torque transmission through the variable transmission means to correspondingly vary the speed ratio between the rotatable member and driven member, and means for rendering said last named means inoperative to vary the ratio between said members irrespective of variations in the speed of and the load on the driven member.

11. In a variable speed transmission mechanism, the combination with a driven member and a member rotatable relative thereto, of reduction gearing between the two members, a friction clutch also interposed between said members and operable to directly connect the same, means automatically controlled by the speed of and the load on the driven member for actuating said clutch, and means under the control of the operator for varying the speed and load at which said clutch actuating means operates to directly connect the driven member to the other of said members, said last named means also operable to maintain said clutch in the position thereof wherein the members are directly connected irrespective of variations in the speed of and the load on the driven member.

12. In a variable speed transmission mechanism, the combination with a driven member, a second member mounted for rotation relative to the driven member and means for rotating the second member in opposite directions, of variable speed transmission means between the second member and driven member, said transmission means including reduction gearing driven by said second member and an overrunning clutch connecting the reduction gearing to the driven member for transmitting torque to the latter through the reduction gearing upon rotation of the second member in one direction and to also permit the driven member to overrun the reduction gearing, means automatically controlled by the speed of and the load on the driven member for directly connecting the driven member to the second member, and additional means between the driven member and second member for transmitting torque from the latter to the former upon operation of the first named means to rotate the second member in the opposite direction.

13. In a variable speed transmission mechanism, the combination with a driven member, a second member mounted for rotation relative to the driven member and means for rotating the second member in opposite directions, of variable speed transmission means between the second member and driven member, said transmission means including reduction gearing driven by said second member and an overrunning clutch connecting the reduction gearing to the driven member for transmitting torque to the latter through the reduction gearing upon rotation of the second member in one direction and to also permit the driven member to overrun the reduction gearing, means automatically controlled by the speed of and the load on the driven member for directly connecting the driven member to the second member, and means for disconnecting the overrunning clutch from the reduction gearing upon operation of the first named means to effect rotation of the second member in the opposite direction.

14. In a variable speed transmission mechanism, the combination with a driven member, a second member mounted for rotation relative to the driven member and means for rotating the second member in opposite directions, of variable transmission means between the second member and driven member, said transmission means including reduction gearing driven by the second member and an overrunning clutch connecting the reduction gearing to the driven member for transmitting torque to the latter through the reduction gearing upon rotation of the second member in one direction and permitting the driven member to overrun the second member, means automatically controlled by the speed of and the load on the driven member for directly connecting the driven member to the second member, a second one-way overrunning clutch between the driven member and second member for transmitting torque from the latter to the former upon operation of the first named means to rotate the second member in the opposite direction, and means operable in dependence upon the actuation of the first named means to rotate the second member in the last named direction to automatically disconnect the first mentioned overrunning clutch and reduction gearing.

15. In a variable speed transmission mechanism, the combination with a driven member and a second member mounted for rotation relative to the driven member, of variable speed transmission means between the second member and driven member including reduction gearing driven by the second member and an overrunning clutch connecting the reduction gearing to the driven member for transmitting torque to the latter through the reduction gearing upon rotation of the second member in one direction, means automatically controlled by the speed of and the load on the driven member for directly connecting the latter to the second member aforesaid, said means including a spiraled spring clutch frictionally engageable with coextensive clutch faces on the aforesaid members and having one end secured to one of the members, and a weight movable outwardly in response to the speed of the driven member and operatively connected to the opposite end of the spiraled spring clutch for actuating the same.

16. In a variable speed transmission mechanism, the combination with a driven member and a second member mounted for rotation relative to the driven member, of variable speed transmission means between the second member and driven member including reduction gearing, means automatically controlled by the speed of and the load on the driven member for directly connecting the latter to the second member aforesaid, said means including a spiraled spring clutch frictionally engageable with coextensive clutch faces on the aforesaid members and having one end secured to one of the members, and a weight movable outwardly in response to the speed of rotation of the driven member and operatively connected to the spiraled spring clutch for actuating the latter.

17. In a transmission mechanism, the combination with a rotating member and a driven member, of variable transmission means between the rotating member and driven member, a friction clutch between the members for directly connecting the same, means responsive to the speed of and the load on the driven member for automatically actuating the clutch including outwardly movable weights actuated by the centrifugal force generated by the driven member and operatively connected to the clutch, means responsive to the operation of the clutch for varying the differential speed between the driven member and rotating member from zero to a predetermined maximum, and means under the control of the operator for holding the weights in a position wherein the clutch is maintained in a position compelling rotation of the driven member at the same angular speed as the rotating member irrespective of load variations on the driven member.

CARL W. FLOSS.